June 20, 1933. E. S. BODINE 1,914,937
APPARATUS FOR READING COLORS
Filed Dec. 15, 1930 4 Sheets-Sheet 1
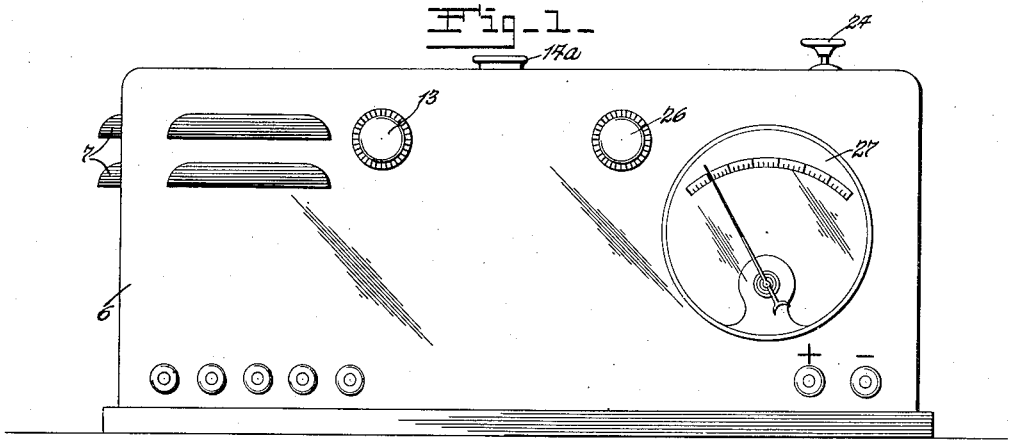
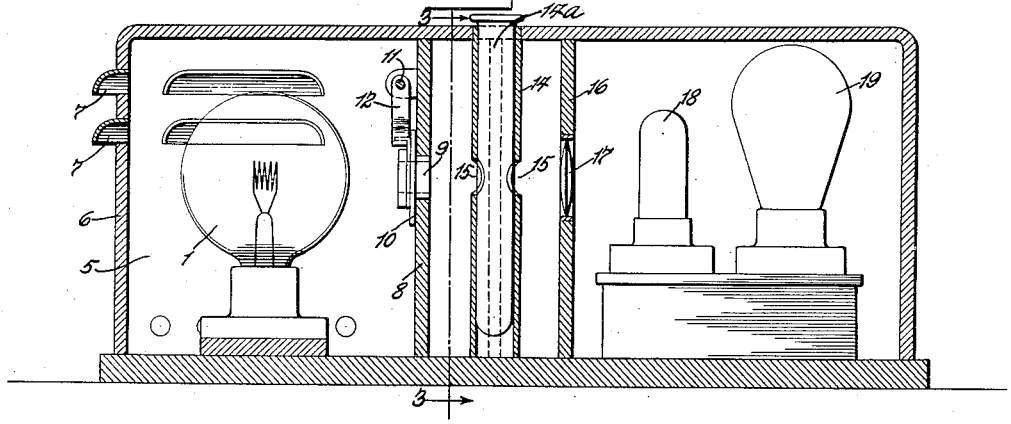
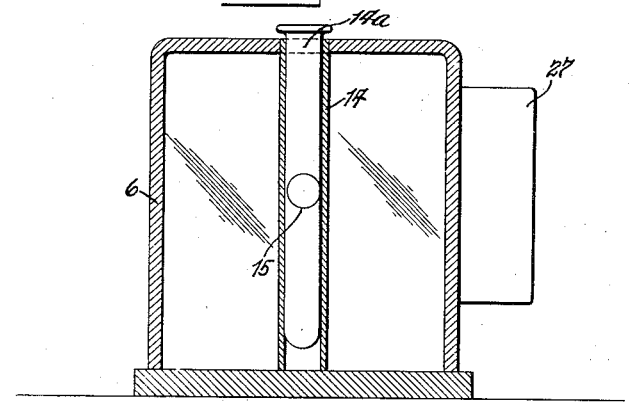
Inventor
Eugene S. Bodine
by Rippey & Kingsland
His Attorneys.

June 20, 1933. E. S. BODINE 1,914,937
APPARATUS FOR READING COLORS
Filed Dec. 15, 1930 4 Sheets-Sheet 2
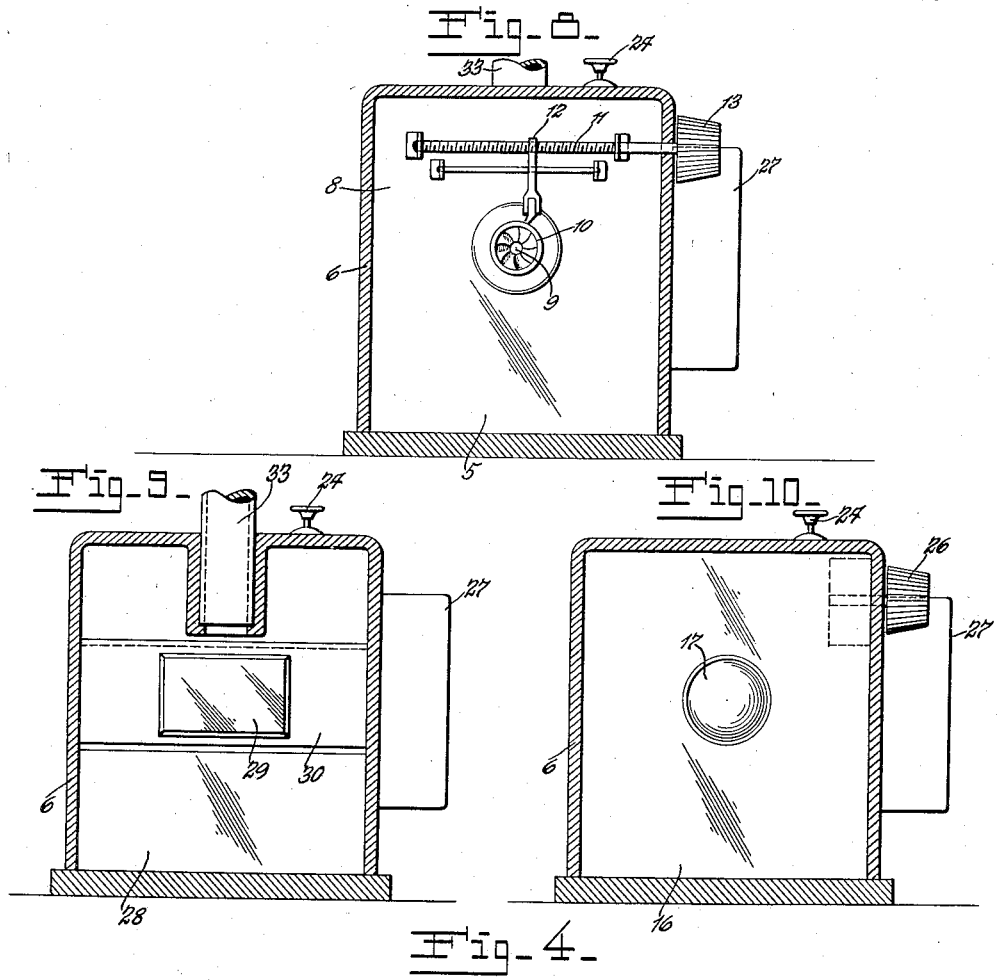
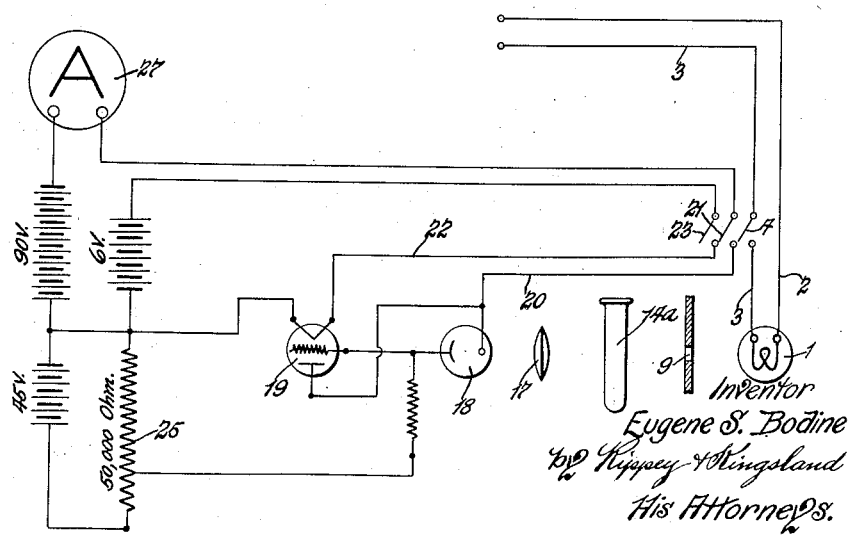
Inventor
Eugene S. Bodine
by Kipsey & Kingsland
His Attorneys.

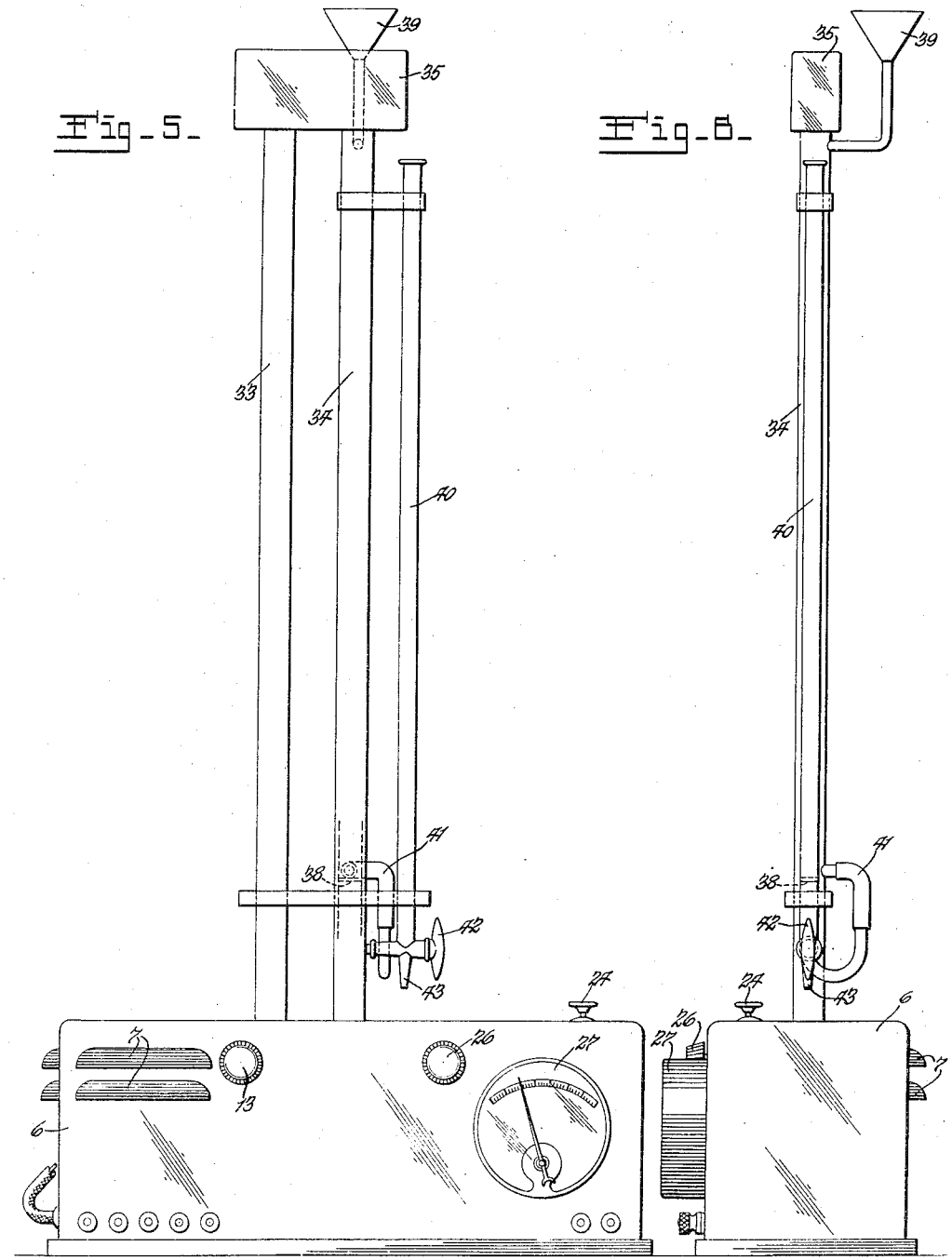

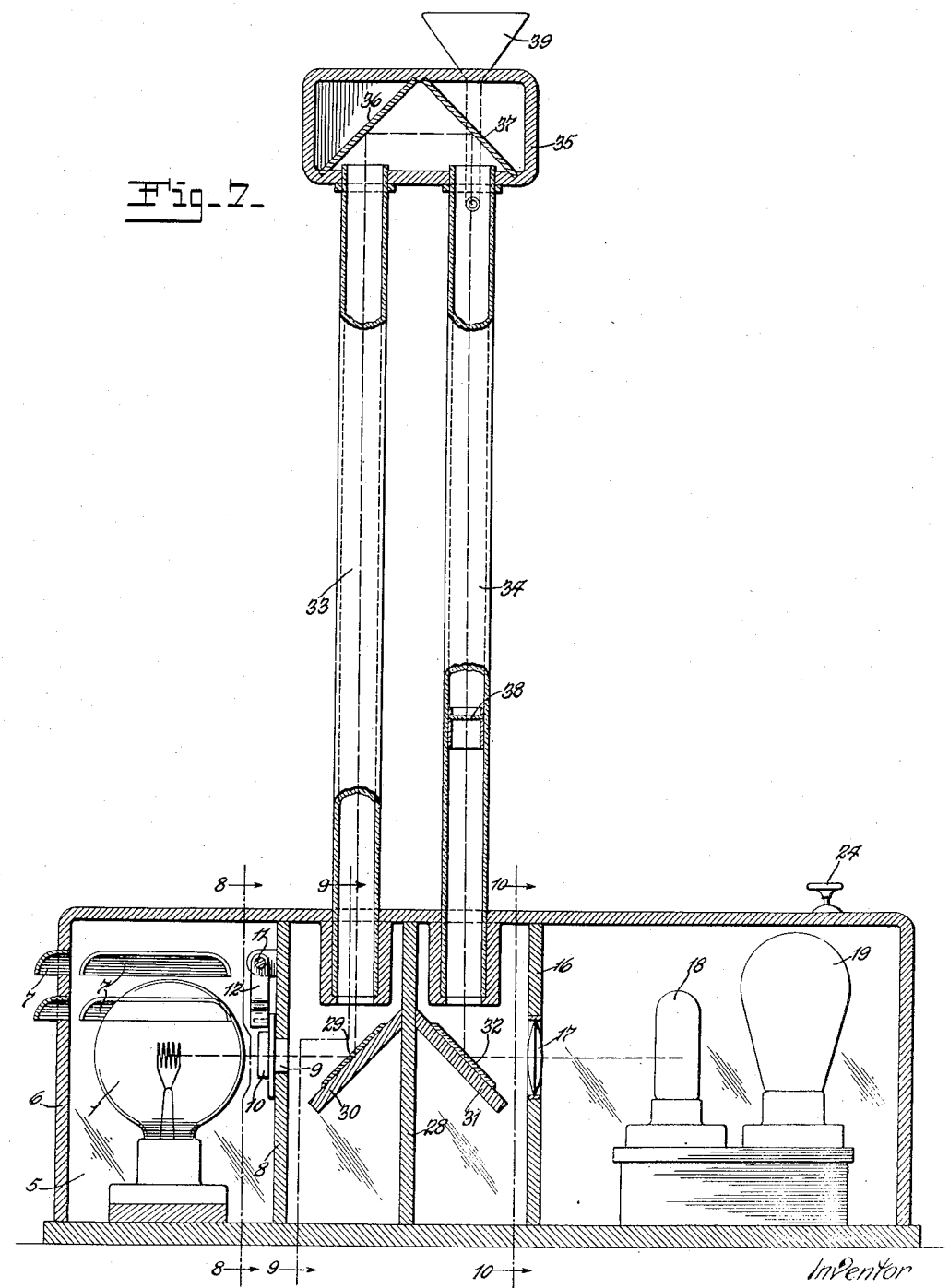

Patented June 20, 1933

1,914,937

UNITED STATES PATENT OFFICE

EUGENE SPENCER BODINE, OF SELLERS, LOUISIANA, ASSIGNOR TO SHELL PETROLEUM CORPORATION, A CORPORATION OF VIRGINIA

APPARATUS FOR READING COLORS

Application filed December 15, 1930. Serial No. 502,610.

This invention relates to apparatus for reading colors of transparent and translucent materials, particularly liquids, and has particular utility in testing lubricating oils and motor fuels.

One of the objects of this invention is to provide apparatus which will indicate on a scale, which may be calibrated in standard colors, the color of the sample being tested in accordance with certain predetermined standards.

Another object of this invention is to provide a device simple in construction, easy of adjustment, and simple in operation, which will distinctly indicate the color of the sample being tested.

Other and specific objects will be apparent from the detail description taken in connection with the accompanying drawings, in which—

Fig. 1 is a front elevation of apparatus embodying this invention.

Fig. 2 is a central vertical section through the apparatus.

Fig. 3 is a vertical section taken on line 3—3 Fig. 2.

Fig. 4 is a diagram of the apparatus including the electric circuits involved.

Figs. 5 to 10, inclusive, illustrate a modification of the apparatus to the extent that means are employed for securing a long path of light through the liquid being tested, and more particularly: Fig. 5 is a front elevation; Fig. 6 is an end elevation; Fig. 7 is a central vertical cross section; Fig. 8 is a vertical section on line 8—8, Fig. 7; Fig. 9 is a vertical section on line 9—9, Fig. 7; and Fig. 10 is a vertical section on line 10—10, Fig. 7.

In accordance with this invention light is projected from a lamp through a regulated aperture and thence through the sample to be tested, and through a condensing lens to a light sensitive cell such as a selenium or a photo-electric cell, through which current is conducted. The current passing through the cell is amplified by an amplifying unit, and the current so amplified is measured by a milliammeter. It will be seen, therefore, that the current passing through the light sensitive cell will depend upon the light that passes through the sample and consequently the reading on the ammeter scale will be dependent upon the sample being tested and will indicate the transparency or translucency of the sample. The scale may be calibrated in terms of a standard color scale such as the N. P. A. scale, or Saybolt scale.

Having generally described the device, a more specific description of the apparatus, with reference to the accompanying drawings, will now be made.

A lamp 1 supplies the effective light for the apparatus; a 50 watt incandescent lamp supplied with the usual 110 volt current, either direct or alternating, has been found satisfactory for this purpose. Small 6 volt battery operated lamps also may be used with satisfactory results.

As indicated in the drawings, the lamp is supplied with current through the wires 2 and 3, a switch 4 being interposed in the line for opening and closing the lighting circuit. The lamp 1 is enclosed within a compartment 5 of a housing 6, and the compartment 5 is provided with louvers 7 for ventilation.

A partition 8 at one side of the lamp 1 is provided with an aperture 9 in a horizontal plane with the lamp filament. The aperture 9 may be regulated by a diaphragm type photographic shutter 10, the shutter being operated by a screw 11 through a block 12, the screw being turned by a knob 13 exterior of the housing 6.

A vertical opaque tube 14, having openings 15 in its side, is placed in line with the aperture 9 and the filament of the lamp 1, the openings 15 being in the same horizontal plane as the aperture 9. The tube 14 is so constructed as to accommodate a glass test tube 14a which may be filled with the liquid to be tested.

A partition 16 supports a by-convex lens 17 and is situated beyond the tube 14, the lens being in line with the openings 15, the aperture 9 and the lamp filament.

A light sensitive cell 18 is mounted so as to receive light rays projected from the lamp 1 through the lens 17. An amplifying tube 19 is connected in the usual manner for the amplification of current passing through the light sensitive cell, as clearly indicated in Fig. 4 of the drawings.

Current for the light sensitive cell may be supplied by a wire 20 controlled by a switch 21, and current for the filament of the amplifying tube may be supplied by a wire 22 controlled by a switch 23. As a matter of convenience the switches 4, 21 and 23 may be combined as a three-blade switch, and operated by a unitary control 24.

The amplifying tube 19 may be controlled by a potentiometer 25 having a knob 26 exterior of the casing.

A milliammeter 27 is placed in circuit to read the amplified current and may be, as noted, calibrated in any convenient scale, such as the scale of N. P. A. colors.

It will be observed that means, comprising the diaphragm shutter, have been provided whereby the aperture 9 may be adjusted to compensate for variance in the lamp brilliancy, or for other adjustment purposes, and that the potentiometer 25, operable by exterior control, is provided whereby necessary adjustment may be made to take care of variations in battery voltage, tube efficiency, and the like. It will readily be seen that if a sample to be tested is placed in the test tube and the switches are operated, the milliammeter will register according to the transparency or translucency of the sample to be tested.

The embodiment illustrated in Figs. 5 to 10, inclusive, differs from the embodiment specifically illustrated in Figs. 1 to 3, inclusive, in the method of placing the sample to be tested, and in the method of passing light from the lamp through the sample and toward the lens and the light sensitive cell. In the embodiment illustrated in Figs. 5 to 10, inclusive, a long path of light through the sample is provided.

A housing 6 has partitions 8 and 16, as in the preceding embodiment, but a further partition 28, between partitions 8 and 16, is provided. A mirror 29 is supported by a bracket 30 secured to the partition 28 and is positioned at an angle of 45 degrees from the horizontal and in line with a path of light from the lamp and through the shutter 10, thus reflecting light in a vertical line.

On the opposite side of the partition a mirror 32 is positioned at an angle of 45 degrees from the perpendicular, being supported by a bracket 31 on the partition 28. The mirror 32 is so positioned as to reflect light coming to it in a vertical plane outwardly in a horizontal plane through the lens 17 and toward the light sensitive cell 18. A pair of opaque tubes 33 and 34 are positioned vertically, having their lower ends open toward the mirrors 29 and 32, respectively. I prefer to construct the tubes of steel with an inside plating of chromium. The upper ends of the tubes 33 and 34 extend into a reflector box 35. Mirrors 36 and 37 are positioned in the reflector box in such a manner as to reflect light passing upwardly through the tube 33 downwardly through the tube 34 in the path as indicated by broken lines Fig. 7.

The tube 34 is adapted to contain the sample to be tested and has a bottom wall 38 comprising a thin disc of glass. A funnel 39, opening into and near the top of the tube 34, provides means for introducing the sample into the tube. A vertical gauge glass 40, in communication with the tube 34, is adapted to indicate the level of the sample in the tube. A communicating tube 41 extends from the bottom of the sample tube 34 and through a cock 42 into the gauge tube 40. The cock 42 is preferably of the three-way type and thus provides means for draining the sample tube 34 through its opening 43.

From the preceding description it will be obvious that the invention accomplishes its purpose. A device simple in construction has been provided, with ease of adjustment and simplicity of operation, which will distinctly indicate the color of the sample to be tested by a dial on a scale which may be calibrated in accordance with a standard color scale.

Parts of the invention may be used to advantage without the whole, and various changes may be made in the details of construction, within the scope of the appended claims, without departing from the spirit of this invention.

I claim:

1. Apparatus of the character described including a housing, a lamp and a light sensitive cell in said housing, and in the same horizontal plane, a vertical opaque tube extending into the housing, a second vertical opaque tube extending into the housing and adapted to contain the sample to be tested, means for reflecting light from the lamp through the first tube, thence through the second tube and toward said cell, an electric circuit under the influence of said cell, and an ammeter for indicating the current passing through the circuit.

2. Apparatus of the character described including a housing, a lamp and a light sensitive cell in said housing, a pair of vertical opaque tubes having their lower ends extending into the housing and their upper ends extending into a reflector box, one of said tubes adapted to contain a sample to be tested, means for directing light from the lamp upwardly through one of said tubes, means in said reflector box for reflecting said light downwardly through the second tube toward the said cell, an electric circuit under the influence of said cell, and an ammeter for indicating the current passing through the circuit.

EUGENE SPENCER BODINE.